United States Patent Office 3,449,285
Patented June 10, 1969

3,449,285
WATER-SETTABLE POLYESTER/FILLER COMPOSITIONS
Stanley Harold Jones, Penarth, Glamorgan, and Parry Williams, Rhondda, Glamorgan, Wales, assignors to British Resin Products Limited, London, England, a British company
No Drawing. Filed July 18, 1967, Ser. No. 654,074
Int. Cl. C08g 51/04
U.S. Cl. 260—40                                 5 Claims

ABSTRACT OF THE DISCLOSURE

Water-settable polyester/inorganic filler compositions which comprise an unsaturated polyester, a monomer copolymerisable therewith, an inorganic filler, a water soluble polymerisation initiator and a solid anhydrous polybasic aliphatic acid or anhydride have improved flow characteristics and shelf-life.

---

The present invention relates to water-settable unsaturated polyester/inorganic filler compositions having improved flow characteristics.

Water-settable polyester/inorganic filler compositions, before addition of water, form a free flowing paste which gradually thickens on ageing until they eventually become too thick to be used practically. The period between the initial formation of the composition and the point where it becomes too thick for practical use is known as the "shelf life." This can vary from as little as a day up to a year at room temperature. The usual shelf life is 1–12 months at room temperature.

It is an object of the present invention to provide water-settable polyester/inorganic filler compositions having improved flow characteristics and shelf life.

Water-settable polyester/inorganic filler compositions, according to the present invention comprise a polymerisable unsaturated polyester, an ethylenically unsaturated monomer other than a solid anhydrous polybasic aliphatic acid or anhydride having 2–14 carbon atoms per molecule, the monomer being copolymerisable with said polyester, an inorganic filler capable of being set with water as hereinafter defined, a water soluble polymerisation initiator which is insufficiently soluble in the polymerisable components to initiate their polymerisation in the absence of heat but which becomes active under aqueous alkaline conditions and at least 0.05 percent by weight in relation to the weight of inorganic filler capable of being set with water of a solid anhydrous polybasic aliphatic acid or anhydride having 2–14 carbon atoms per molecule.

The unsaturated polyesters are of the type known from the literature and can be prepared by poly-condensation of a polycarboxylic acid (or anhydride) with a polyhydric alcohol, one of the components having non-aromatic unsaturation capable of undergoing addition polymerisation. The dicarboxylic acids and dihydric alcohols are mainly used especially the $\alpha,\beta$-unsaturated $\alpha,\beta$-dicarboxylic acids. The unsaturated acids may be partly replaced by a saturated polycarboxylic acid e.g. phthalic or isophthalic acids. It is preferred to use a mixture of saturated and unsaturated dibasic acids together with a glycol. Suitable unsaturated acids are for example, maleic, fumaric, or their anhydrides. Suitable dihydric alcohols are for example ethylene glycol, diethylene glycol, propylene glycol and hexylene glycol. Part of the dihydric alcohol may be replaced by polyhydric alcohols such as pentaerythritol or by monohydric alcohols such as cyclohexanol.

Suitable ethylenically unsaturated monomers are known from the literature and include monomeric vinyl and substituted vinyl compounds such as vinyl esters, the esters of acrylic, methacrylic, maleic or fumaric acids, allyl and polyallyl compounds and vinyl aromatic compounds such as styrene. The monomer can be a monomeric vinyl compound in which the polyester is normally dissolved.

The polyesters contain a proportion of unreacted carboxyl groups in the polymer chain and these give it an acid value. Particularly suitable polyesters have acid values of from 10 to 50 milligrams of potassium hydroxide per gram.

Most suitably the combined weight of polyester and copolymerisable monomer in relation to the total weight of the composition is in the range 5 to 95 percent and preferably in the range 25 to 85 percent. The weight of polyester in relation to the combined weight polyester and monomer is most suitably in the range 20 to 80 percent and preferably in the range 50 to 70 percent.

By the term inorganic filler capable of being set with water is meant a substance which after having been stirred with water exhibits or induces an alkaline reaction preferably but not exclusively caused by calcium hydroxide and which sets to a solid mass. Examples of such fillers are the hydraulic mortars, in particular the cements such as portland cement, ferro-portland cement, blast furnace cement (slag cement), high alumina cement (ciment de la Farge), lime-pozzolana cement, natural cements which are employed in admixture with quicklime and also the hydraulic limes and Roman cement. Portland cement is preferred and such cement is obtained by the heat treatment of a mixture of chalk (or other calcareous earth compound) and clay (or other siliceous earth compound) but may include any inorganic substance which is hydraulic (i.e. which on mixing with water at ambient temperature reacts to produce a crystalline lattice structure exhibiting a degree of mechanical stability and/or physical strength). The cements can be any colour and are preferably ground to a powder having a surface area of from 1,000 to 10,000 square centimetres per gram at the time of incorporation in the composition. Portland cement which has been milled with a fatty acid such as stearic acid produces more stable dispersions when incorporated in the compositions than the cement without the acid. The oleophilic coating of the cement particles also improves the efficiency with which the cement disperses when added to the polyester and monomer.

The weight of inorganic filler capable of being set with water in relation to the total weight of the composition can be in the range 5 to 95 percent and is most suitably in the range 20 to 80 percent. About 40 percent by weight of this filler has been found to be the best all round proportion.

The quantity of water used to hydrate the filler and initiate polymerisation of the monomer is preferably in the region of 25 percent based on the weight of the filler present in the composition. Most suitably a minimum water content is about 15 percent and lower strength products are found if the water content exceeds 40 percent by weight. However, satisfactory compositions can be provided which require as little as 5 percent by weight of water in relation to the weight of filler. The minimum quantity depends principally on the amount of filler in the composition.

In addition to the inorganic filler capable of being set with water an inert filler can be present in the composition. These additional fillers should be added to the composition shortly before use.

The water-soluble polymerisation initiators are free radical-forming compounds which are not soluble in the monomer and/or polyester but are present as a fine dispersion in the monomer and polyester. The preferred initiators are active at a pH in the range 7.5 to 11. These compounds are oxygen-rich and particularly suitable examples are the water-soluble salts of peracids such as persulphuric acid, especially ammonium and sodium persulphate. The free radical-forming compounds can comprise the oxygen-rich compounds on the one part and reactants with these such as reducing agents on the other part. Thus, the salts of peracids may be used as initiators and sulphites used as activators, the two forming a redox initiator system such as that described by C. E. Schildknecht in "Vinyl and Related Polymers" (Publ. John Wiley 1952) p. 93, Chapter II. The reducing agents are not essential, the salts of peracids being capable of acting as initiators in the presence of portland cement without added activator. The activator may be any suitable stable reducing agent and sodium metabisulphite is typical, being the preferred but not restricted compound. Other activating materials and/or driers such as cobalt naphthenate may also be present with any other desired conventional additives.

The most suitable solid anhydrous polybasic acids are aliphatic acids having 2 to 14 carbon atoms per molecule. These acids are preferably dibasic. Some examples are maleic, fumaric, oxalic, azelaic, sebacic, mesaconic, citric, citraconic, tartaric and succinic acid. The preferred acids are fumaric, oxalic and succinic acid.

The minimum amount of anhydrous acid which can be present in the composition appears to depend upon a number of factors such as the strength and molecular configuration of the acid or anhydride groups and also on the solubility of the acids and their salts in water and in the polyester/unsaturated monomer compositions.

The principal factor appears to be the amount of free lime present in the inorganic filler. In practice it has been found that a minimum of about 0.05 percent by weight of acid in relation to the weight of water-settable inorganic filler is essential. However, for most applications a practical minimum will be at least about 0.2 percent by weight in relation to the weight of water settable inorganic filler. The upper limit depends principally on economic considerations and for most practical purposes is about 20 percent by weight in relation to the weight of water-settable inorganic filler. A preferred limit is in the range 0.5 to 10 percent.

The following examples illustrate water-settable polyester/inorganic filler compositions according to the present invention.

Example 1

An unsaturated polyester based on phthalic and maleic anhydrides, propylene and diethylene glycols condensed to an acid value of approximately 30 mg. KOH/gram was dissolved in styrene to give a 65 percent by weight solution containing hydroquinone as inhibitor.

Water-settable compositions were made up from the components described below using this polyester/monomer solution. These compositions differ from each other only in the solid anhydrous dibasic acid component which was selected from maleic, fumaric, oxalic, succinic, azelaic and citraconic acids.

| | Parts by weight |
|---|---|
| Polyester/monomer solution (65%) | 60 |
| Hydracrete cement (a registered trademark) | 40 |
| Ground solid anhydrous dibasic acid | 2 |
| Ammonium persulphate | 2 |

These compositions had a shelf life of more than 6 months at room temperature and approximately 3 months at 40° C.

By way of comparison a similar composition was made up without anhydrous dibasic acid. This composition had a shelf life of less than 4 days at room temperature and less than one day at 40° C.

Example 2

Water-settable compositions were made up containing different amounts of fumaric acid using the polyester/monomer solution described in Example 1 and the following proportions of components:

| | Parts by weight |
|---|---|
| Polyester/monomer solution (65%) | 60 |
| Hydracrete cement (a registered trademark) | 40 |
| Fumaric acid | $x$ |
| Ammonium persulphate | 2 |

Shelf life and behaviour on storage of these compositions containing varying quantities of fumaric acid $x$ are described in the following Table 1. A control composition without fumaric acid is shown by way of comparison.

TABLE 1

| Parts by weight, $x$ of fumaric acid | Shelf life and behaviour on storage at— | |
|---|---|---|
| | Room temperature (ca. 20° C.) | 40° C. |
| 0 (control) | Gelled solid within 4 days | Gelled solid within 1 day. |
| 0.25 | Thickened over 0–7 days, gelled solid at 10 days. | Gelled solid within 3 days. |
| 0.5 | Thickened over 0–7 days, rubbery gel at 10 days. | Rubbery gel within 10 days. |
| 1.0 | Thickened slightly but not gelled at 5 months. | Thickened over 4 weeks. Thick but not gelled at 5 months. |
| 2.0 | do | Do. |

Example 3

A polyester based on phthalic and maleic anhydrides, and propylene glycol condensed to an acid value of approximately 40 mg. KOH/gram was dissolved in styrene to a 65 percent solution by weight containing hydroquinone as inhibitor.

Water-settable compositions were made up using this polyester/monomer solution containing varying amounts of fumaric acid and the following components.

| | Parts by weight |
|---|---|
| Polyester/monomer solution (65%) | 60 |
| Hydracrete cement (a registered trademark) | 40 |
| Fumaric acid | $x$ |
| Ammonium persulphate | 2 |

Shelf life and behaviour on storage of these compositions containing varying quantities of fumaric acid $x$ are described in the following Table 2. A control composition without fumaric acid is given by way of comparison.

TABLE 2

| Parts by weight, $x$ of fumaric acid | Shelf life and behaviour on storage at— | |
|---|---|---|
| | Room temperature (ca. 20° C.) | 40° C. |
| 0 (control) | Thickened, 0–2 weeks. Very thick, 4 weeks. Gelled solid, 6 weeks. | Thickened and gelled solid at 7 days. |
| 0.25 | Slightly thicker at 6 months. | Slightly thicker at 4 weeks. Very thick at 3 months. Gelled solid at 4 months. |
| 0.5–2.0 | Do | Only slightly thicker at 6 months. |

We claim:

1. A water settable polyester/inorganic filler composition comprising:
   (a) 25 to 85 percent by weight in relation to the total weight of the composition of a polymerizable unsaturated polyester and an ethylenically unsaturated monomer copolymerizable with said polyester;
   (b) 20 to 80 percent by weight in relation to the total weight of the composition of an inorganic filler which after having been stirred with water exhibits or induces an alkaline reaction and which sets to a solid mass;
   (c) an effective amount of a water soluble polymerization initiator which becomes active under aqueous alkaline conditions; and
   (d) 0.05 to 20 percent by weight in relation to the weight of the inorganic filler of a solid anhydrous polybasic aliphatic acid or anhydride of 2 to 14 carbon atoms per molecule.

2. A composition as claimed in claim 1 wherein the weight of the unsaturated polyester in relation to the combined weight of polyester and copolymerizable monomer is in the range 50 to 70 percent.

3. A composition as claimed in claim 1 wherein the weight of anhydrous polybasic aliphatic acid or anhydride in relation to the weight of water-settable inorganic filler is in the range 0.5 to 10 percent.

4. A composition as claimed in claim 1 wherein the polymerization initiator is one which is active under aqueous alkaline conditions in a pH range of 7.5 to 11.

5. A water-settable polyester/inorganic filler composition comprising:
 (a) a polymerizable unsaturated polyester;
 (b) an ethylenically unsaturated monomer copolymerizable with said polyester wherein the combined weight of polyester and monomer in relation to the total weight of the composition is in the range of from 25 to 85 percent;
 (c) an inorganic filler which after having been stirred with water exhibits or induces an alkaline reaction which sets to a solid mass, the filler being present in a proportion by weight in relation to the total weight of the composition in the range of from 20 to 80 percent;
 (d) an effective amount of a water soluble polymerization initiator which becomes active under aqueous alkaline conditions; and
 (e) 0.5 to 10 percent by weight in relation to the weight of water-settable inorganic filler of a solid anhydrous dibasic aliphatic acid or anhydride selected from the group consisting of maleic, fumaric, oxalic, succinic, azelaic and citraconic acids and anhydrides.

References Cited
UNITED STATES PATENTS 3,240,736  3/1966  Beckwith _____ 260—40 X MORRIS LIEBMAN, *Primary Examiner.*

L. T. JACOBS, *Assistant Examiner.*